United States Patent [19]

Newbould

[11] 4,092,582

[45] May 30, 1978

[54] ELECTRICAL COUPLING ARRANGEMENTS

[75] Inventor: Adrian Orton Newbould, Stafford, England

[73] Assignee: The General Electric Company Limited, London, England

[21] Appl. No.: 747,241

[22] Filed: Dec. 3, 1976

[30] Foreign Application Priority Data

Dec. 12, 1975 United Kingdom ............... 50972/75

[51] Int. Cl.² ............................................. H01F 39/00
[52] U.S. Cl. ........................................ 323/48; 323/50; 323/88; 336/170; 336/182
[58] Field of Search ................. 323/48, 50, 83, 88; 336/155, 170, 180, 182, 184, 145, 146, 147

[56] References Cited

U.S. PATENT DOCUMENTS

| | | | |
|---|---|---|---|
| 1,875,156 | 8/1932 | Roberts | 323/50 |
| 2,258,147 | 10/1941 | Roberts | 336/182 |
| 2,598,617 | 5/1952 | Stimler | 323/48 |
| 2,686,291 | 8/1954 | Macklem | 323/88 |
| 3,748,570 | 7/1973 | Martner | 323/50 |

*Primary Examiner*—Gerald Goldberg
*Attorney, Agent, or Firm*—Kirschstein, Kirschstein, Ottinger, Frank & Cobrin

[57] ABSTRACT

An electrical coupling arrangement suitable for connecting protective relays to the primary current transducers in an alternating current power transmission system, comprising three winding arrangements flux linked so that an a.c. input current applied to one winding arrangement provides an a.c. output voltage substantially free of d.c. transients at a second winding arrangement, the third winding arrangement including a resistance which is variable and whose value determines the phase relationship between the output voltage and the input current.

6 Claims, 6 Drawing Figures

ELECTRICAL COUPLING ARRANGEMENTS

This invention relates to electrical coupling arrangements and has an important application to electrical coupling arrangements for connecting protective relays to the primary current transducers in an alternating current power transmission system.

According to the present invention an electrical coupling arrangement comprises three winding arrangements flux linked so that an a.c. imput current applied to one winding arrangement provides an a.c. output voltage substantially free of d.c. transients at a second winding arrangement, the third winding arrangement including resistance means which is variable and whose value determines the phase relationship between the output voltage and the input current.

The flux linkages between the winding arrangements are arranged so that, for a given value of input current, a substantially constant flux and a variable flux link the second winding arrangement which provides the output voltage. Preferably the resistance means is variable in a manner such that a vector representing the variable flux follows a semi-circular locus as the resistance means is varied from infinity to zero. The substantially constant flux is then arranged so that the origin of a vector representing resultant of the fluxes linking the second winding arrangement lies along the diameter of the semicircular locus followed by the vector. If the magnitude of the substantially constant flux is made equal to the radius of the semicircular locus, the origin of the vector representing the resultant flux will then lie at the center of a circle of which the semicircular locus forms part.

In the latter case the coupling arrangement is particularly suitable for connecting protective relays to the primary current transducers in an alternating current power transmission system.

The flux linked winding arrangements may be air-cored, or may be provided with ferromagnetic cores to assist or enhance the flux linkages. The ferromagnetic cores may be provided with air gaps.

The invention will now be described, by way of example, with reference to the accompanying drawings in which.

Figure 1:
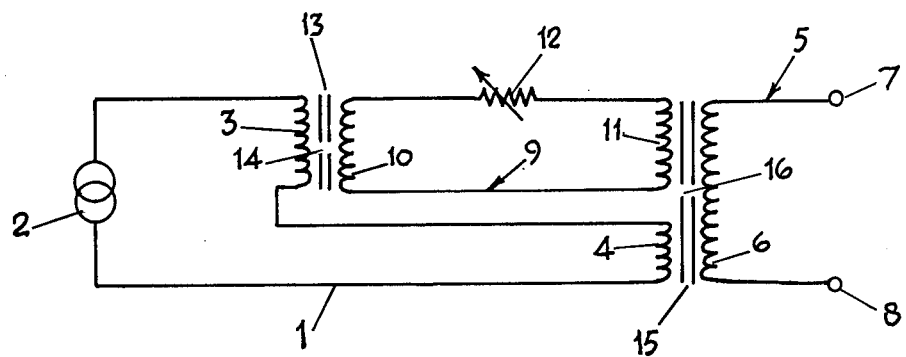
FIG. 1 is a schematic circuit diagram of an electrical coupling arrangement in accordance with the invention.
Figure 2:
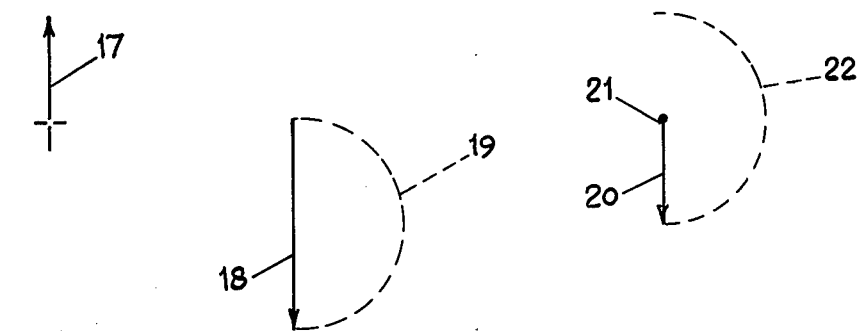
FIG. 2 shows various vectors which will be used to explain the operation of a coupling arrangement in accordance with the invention.

Referring in the first instance to FIG. 1 and 2, the coupling arrangement comprises a first winding arrangement 1 connected to a source of alternating current 2 and comprising a winding 3 and a winding 4 connected in series. A second winding arrangement 5 is formed by a single winding 6 connected between two output terminals 7 and 8. A third winding arrangement 9 comprises a winding 10 and a winding 11 connected in series with a variable resistance 12 which can be varied between zero and infinity.

A ferromagnetic core 13 having an air gap 14 is arranged to enhance the flux linkage between the winding 3 of the first winding arrangement 1 and the winding 10 of the third winding arrangement 9. A ferromagnetic core 15 having an air gap 16 is arranged to enhance the flux linkage between the winding 11 of the third winding arrangement 9 and the winding 6 of the second winding arrangement 5, and also to enhance the flux linkage between the winding 4 of the first winding arrangement 1 and the winding 6 of the second winding arrangement 5.

The coupling arrangement functions in the following manner to provide an a.c. output voltage substantially free of d.c. transients across output terminals 7 and 8, having a substantially constant amplitude and a predetermined phase relationship to an a.c. input current caused to flow in the first winding arrangement 1 by the alternating current source 2. When the a.c. input current is flowing through the first winding arrangement 1, the magnetic flux set up by the current flowing in the winding 4 links with the winding 6 of the second winding arrangement 5. The a.c. input current flowing in the winding 3 sets up a magnetic flux which links with the winding 10 and causes a current to flow in the third winding arrangement 9. The magnetic flux set up by the current flowing in the winding 11 of the third winding arrangement 9 links with the winding 6 of the second winding arrangement 5.

The magnetic flux linking the winding 4 of the first winding arrangement 1 and the winding 6 of the second winding arrangement 5 is dependent on the parameters of these winding arrangements and is arranged to be substantially constant. This substantially constant mangetic flux is represented by the vector 17 shown in FIG. 2. The magnetic flux which links the winding 11 of the third winding arrangement 9 and the winding 6 of the second winding arrangement 5 is dependent on the parameters of these winding arrangements and is represented by the vector 18 shown in FIG. 2. This latter magnetic flux can be varied in magnitude and phase by the variable resistance 12 so that the vector 18 follows the semicircular locus 19 as the resistance 12 is varied from infinity to zero. The resultant flux which links with the winding 6 of the second winding arrangement 5 can be represented by a vector (not shown) having an origin which lies at a point along the diameter of the semicircular locus 19.

If the magnitude of the vector 17 is made equal to the radius of the semicircular locus 19, the vector 20 representing the resultant flux has an origin 21 which lies on the centre of a circle of which its semicircular locus 22 forms part. The resultant flux sets up the a.c. output voltage across the second winding arrangement 5. Hence the magnitude of the a.c. output voltage, which is developed between terminals 7 and 8, remains substantially constant while its phase angle is varied through 180° relative to the a.c. input current, by varying the value of the resistance 12. This embodiment of the invention is particularly useful for connecting a protective relay to a primary current transducer in an alternating current power transmission system, the current transducer providing the current source 2 and the protective relay circuit being connected across the output terminals 7 and 8.

Figure 3:
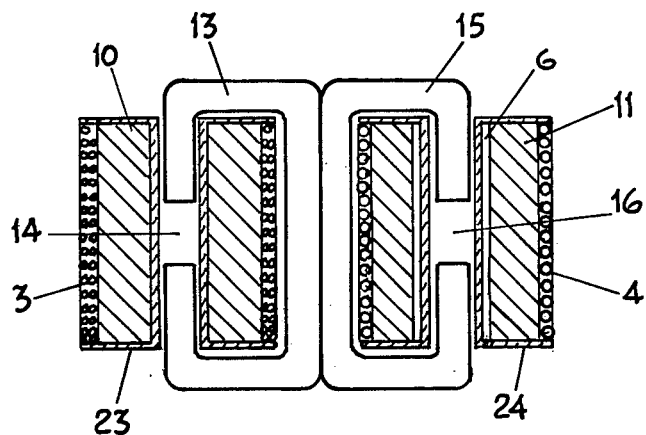
FIG. 3 shows a sectional elevation of the three winding arrangements represented schematically in FIG. 1.

Referring now to FIG. 3, in the structure shown the two ferromagnetic cores 13 and 15 which are substantially C-shaped are arranged back to back and are provided with respective coil formers 23 and 24 located on the limbs having the air gaps 14 and 16. The winding 10 of the third winding arrangement 9 is wound on the former 23 and is surrounded by the winding 3 of the first winding arrangement 1. The winding 6 of the second winding arrangement 5 is wound on the former 24 and is surrounded by the winding 11 of the third winding arrangement 9 which is in turn surrounded by the winding 4 of the first winding arrangement 1. The variable resistance 12 is not shown and is formed by a separate component connected in series with the windings 10 and 11.

Figure 4:
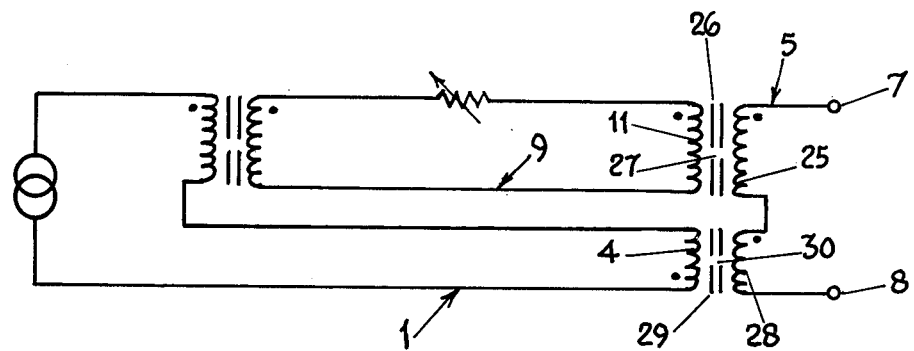
FIG. 4 is a schematic circuit diagram of another electrical coupling arrangement in accordance with the invention.

It is not essential for the windings 4, 6 and 11 to be accommodated on a single ferromagnetic core, and in the coupling arrangement illustrated in FIG. 4 the winding 11 of the third winding arrangement and a winding 25 of the second winding arrangement 5 are accommodated on a ferro-magnetic core 26 having an air gap 27, whilst the winding 4 of the first winding arrangement 1 and a winding 28 of the second winding arrangement 5 are accommodated on a ferromagnetic core 27 having an air gap 28.

In the coupling arrangement illustrated in FIG. 4 the variable flux produces an a.c. voltage across the winding 25 of the second winding arrangement 5, whilst the constant flux produces an a.c. voltage across the winding 28 of the second winding arrangement 5. Since the two windings 25 and 28 of the second winding arrangement 5 are connected in series across output terminals 7 and 8, an a.c. output voltage indicative of the resultant flux is produced across the output terminals 7 and 8.

Figure 5:
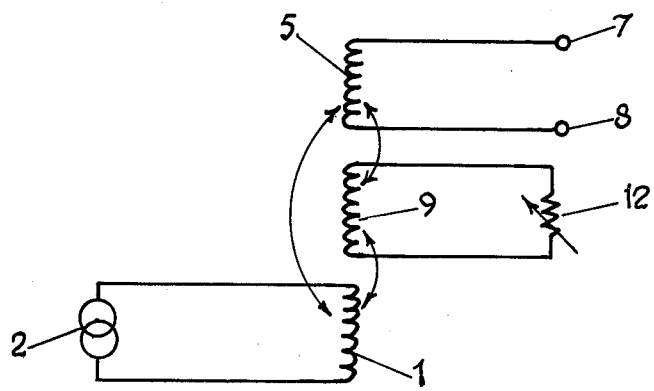
FIG. 5 is a schematic circuit diagram of a further electrical coupling arrangement in accordance with the invention.

The air-cored coupling arrangement illustrated in FIG. 5 comprises a first winding arrangement 1, formed by a single winding, connected to a source of alternating current 2 and a second winding arrangement 5, also formed by a single winding, connected between output terminals 7 and 8. A third winding arrangement 9, again formed by a single winding, has a variable resistance 12 connected in series therewith. The three winding arrangements 1, 5 and 9 are flux-linked as indicated by the double-headed arrows.

The air-cored coupling arrangement functions in the following manner to provide an a.c. output voltage substantially free of d.c. transients across output terminals 7 and 8, having a substantially constant amplitude and a predetermined phase relationship to an a.c. input current caused to flow in the first winding arrangement 1 by the alternating current source 2. When the a.c. input current is flowing through the first winding arrangement 1 the magnetic flux set up in the first winding arrangement 1 which links the second winding arrangement 5 is substantially constant and is represented by the vector 17 shown in FIG. 2. The a.c. input current flowing in the first winding arrangement 1 also sets up a magnetic flux which links with the third winding arrangement 9 and causes a current to flow in the third winding arrangement 9. The magnetic flux set up by the current flowing in the third winding arrangement 9, which also links with the second winding arrangement 5, can be varied in magnitude and phase by the variable resistance 12 and is represented by the vector 18. The resultant of the constant and variable flux sets up the a.c. output voltage across the second winding arrangement 5.

As before the magnitude of the vector 17 may be made equal to the radius of the semicircular locus 19, so that the vector 20 representing the resultant flux has an origin 21 which lies at the centre of a circle of which its semicircular locus 22 forms part. Hence the a.c. output voltage developed between terminals 7 and 8 remains substantially constant while its phase angle is varied through 180° relative to the a.c. input current, by varying the value of the variable resistance 12.

Figure 6:
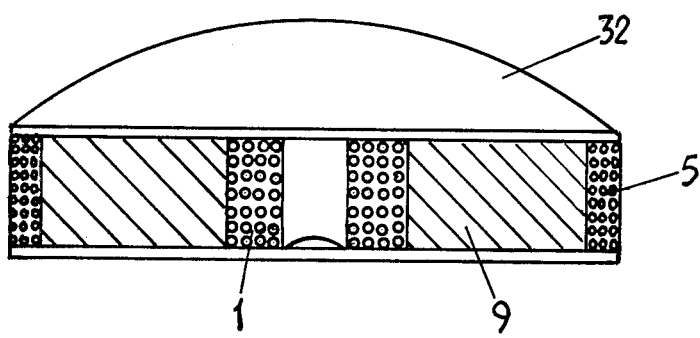
FIG. 6 shows a sectional elevation of the three winding arrangements represented schematically in FIG. 5.

In the structure shown in FIG. 6 the first winding arrangement 1 is accommodated on a coil former 32 and is surrounded by the third winding arrangement 9. The second winding arrangement 5 is also accommodated on the former 32 surrounding the third winding arrangement 9. The variable resistance 12 is not shown and is formed by a separate component connected in series with the third winding arrangement 9. Additional adjustment of the flux linkages between the three winding arrangements 1, 5 and 9 may be brought about by changing the relative diameters of the second winding arrangement 5 and the first winding arrangement 1 and then filling the gap between them with the third winding arrangement 9.

In the coupling arrangements described above the phase displacement between the a.c. output voltage and a.c. input current is 180°, however, by reversing the polarity of the second winding arrangement 5, in each case, phase shifting over the other two quadrants of the circle of which the semicircular locus 22 forms part, can be obtained. Moreover, by altering the ratio between the magnitudes of the fluxes linked by the three winding arrangements, the origin 21 of the resultant flux vector can be moved along the diameter of the circle of which the semicircular locus forms part.

I claim:
1. An electrical coupling arrangement comprising:
   (a) a first winding arrangement;
   (b) a second winding arrangement;
   (c) a third winding arrangment;
   (d) the three winding arrangements being constructed and relatively located to be linked by magnetic flux produced thereby;
   (e) the parameters of the first and second winding arrangements being such that the second winding arrangement in response to an AC input current applied to the first winding arrangement produces an AC output voltage substantially free from DC transients;
   (f) the third winding arrangement including resistance means which is variable and whose value determines the phase relationship between the output voltage and the input current;
   (g) the three winding arrangements being so flux linked that, for a given input current, a substantially constant flux and a variable flux link the second winding arrangement; and
   (h) the resistance means being variable in a manner such that a vector representing said variable flux follows a semicircular locus as the value of the resistance means is varied from infinity to zero, so that the output voltage can be adjusted to have a predetermined phase relationship to the given input current and an amplitude proportional to that of the given input current.

2. A coupling arrangement as claimed in claim 1, wherein the flux linkages between the three winding arrangements are such that, for the given input current, the amplitude of the output voltage is substantially constant throughout the variation of the resistance means.

3. A coupling arrangement as claimed in claim 1, wherein the magnitude of the substantially constant flux is equal to the radius of the semicircular locus so that the origin of a vector representing the resultant flux lies at the center of a circle of which the semicircular locus forms part.

4. A coupling arrangement as claimed in claim 1, wherein the three flux linked winding arrangements are wound on at least one ferromagnetic core to assist or enhance the flux linkages.

5. A coupling arrangement as claimed in claim 4, wherein a ferromagnetic core is provided with an air gap.

6. A coupling arrangement as claimed in claim 1, wherein the three flux linked winding arrangements are air cored.

* * * * *